Jan. 31, 1928.

C. J. SHADDEN

HOSE COUPLING

Filed Sept. 11, 1926

Inventor
Charles J. Shadden,

By Clarence A. O'Brien
Attorney

Patented Jan. 31, 1928.

1,657,488

UNITED STATES PATENT OFFICE.

CHARLES J. SHADDEN, OF LOUP CITY, NEBRASKA.

HOSE COUPLING.

Application filed September 11, 1926. Serial No. 134,841.

This invention relates to improvements in hose couplings which are used in connection with garden hose and particularly fire hose.

An object of the invention resides in providing a hose coupling in which the parts are adapted for assembly and detachment without the use of wrenches, screw drivers, hammers or the like, and in which the parts may be easily assembled and disassembled for use by hand.

A further object of the invention resides in providing a hose coupling in which a female member is formed with a chamber adapted to receive a male assembly including a pair of relatively movable elements mounting an expansible packing and locking member so that the insertion of the male assembly into the chamber of the female member is obtained in one relation of the elements, and one element then moves relative to the other so as to expand the expansible member carried thereby for locking cooperation with the female member to lock said male assembly in coupled relation with the female member with suitably means for normally operating the elements to permit insertion and removal of the male assembly from the female member, and other means to permit the locking of the parts in assembled relation, packing or expansible means in expanded relation.

The invention comprehends numerous other objects residing in the details of construction and arrangement of the parts which are more particularly pointed out in the following description and claim, directed to a preferred form of the invention, it being understood, however, that various changes in the size, shape and arrangement of the parts may be made without departing from the spirit and scope of the invention as herein set forth.

In the drawings forming part of this application:—

Figure 1:
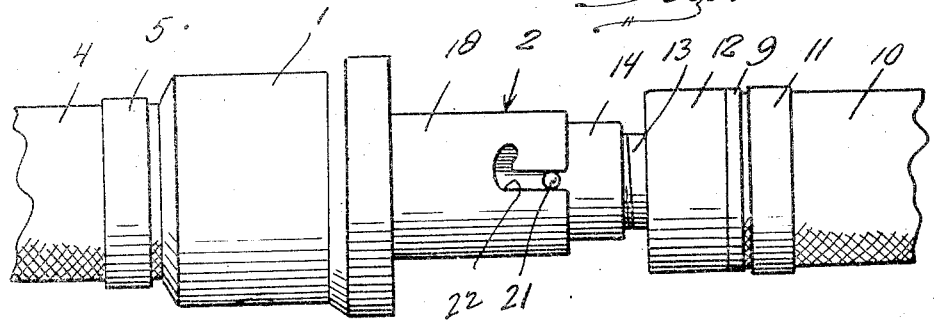
Figure 1 is a side elevation of the hose coupling forming the subject matter of this invention, with the parts shown in partially assembled relation.

1 indicates the female member of the coupling, while 2 indicates the male assembly generally.

The female member is formed with a reduced threaded extension 3 at one end to receive the end of a flexible hose or the like indicated at 4 which is retained on the threaded end through the cooperation of the threads of the reduced extension 3 internally of the hose, and the band spirals arranged externally thereon. The major portion of the female member is provided with an enlarged internal cylindrical chamber 6, which at the free end thereof is provided with the inwardly extending flange 7, restricting the opening into the chamber as illustrated in Fig. 2.

The male member includes a hose engaging member 8 formed with a central annular flange 9 having the opposite ends of the member beyond said flange threaded, one end being adapted to threadedly receive the end of the hose section 10 which is banded as indicated at 11, so that the hose section will be rigidly retained on said member 8. The opposite end thereof receives the flange collar 12 which retains the flanged nipple 13 with the collar and hose engaging member. The free end of the flanged nipple 13 is externally threaded for threadedly receiving the internally threaded collar 14, the opposite end of which threadedly mounts tapered packing carrying element 15, particularly illustrated in Fig. 2. This element 15, has the free end thereof flared outwardly as indicated at 16 and formed with an annular outwardly projecting flange 17 on the end thereof of a diameter slightly less than the internal diameter of the flange 7 of the female member so that the element 15 may be freely inserted into the chamber 6 into the female member as shown in Fig. 2.

Figure 2:
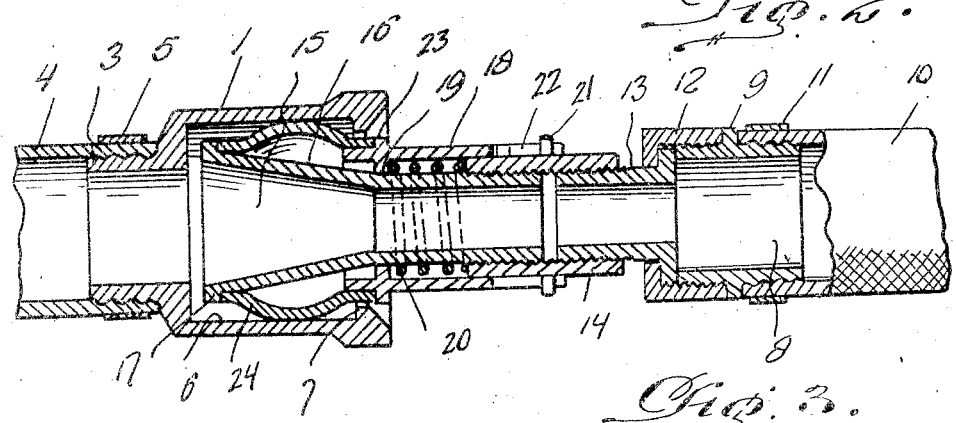
Fig. 2 is a vertical longitudinal section thru the coupling shown in Fig. 1.

A sleeve element 18 is slidably mounted on the collar 14 and is provided with an internal flange adjacent one end as indicated at 19 with which engages the expansible coiled spring 20 having abutments against one end of the collar 14 as shown in Fig. 2, so that the sleeve member 18 is normally operated to slide on the collar 14 toward the free end of the element 15 as shown in Fig. 2. The sleeve member 18 is held against rotation on the collar 14 through the pair of pins 21 provided on the collar 14 engaging in the bayonet slots 22 formed in one end of the sleeve 18, the opposite end of the sleeve 18 being formed with an annular external flange 23 spaced from the end portion as shown in Fig. 2.

Expansible resilient packing and locking member 24 which is of cylindrical form, is mounted over the element 15 as shown in Fig. 2, and has one end abutting the inner face of the flange 17 and the other end positioned on the free end portion of the sleeve 18 and abutting the annular flange 23 as shown in Fig. 2.

With the parts of the hose coupling constructed as above set forth, it will be understood that the spring 20 will normally operate the sleeve 18 on collar 14 toward the flanged end of the element 15 so as to normally compress the cylindrical and expansible member 24 to provide an outward bulge in the same as shown in Fig. 2 in order that it may be engaged with the inner periphery of the chamber 6 of the female member 1 for locking cooperation therein to assemble the female coupling to the male assembly 2 in fluid-tight relation as shown in Fig. 2 to permit the conveyance of fluid through the hose sections 4 and 10 which is usually under pressure.

Figure 3:
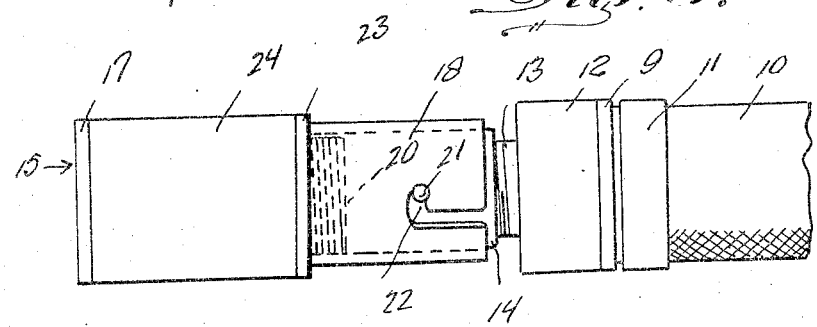
Fig. 3 is an elevation of the male assembly of the coupling with the elements in the normal position so that it may be inserted or removed from the female member.

When it is desired to disconnect the coupling members or sections, sleeve 18 is manually operated to take the pins 21 in the inner end of the bayonet slots for retaining the spring 20 in compressed relation in order that the expansible member 24 will be drawn outwardly and retracted to the position shown in Fig. 3. With the parts of the male assembly in the position in Fig. 3, the same may be readily removed from the female member 1 or inserted therein for subsequent coupling of a pair of hose sections.

It will thus be seen from the above description that a highly novel and efficient hose coupling structure has been provided wherein the sections of the coupling may be readily assembled and disassembled without the use of a wrench, screw driver, or other instrument in order to provide operation of parts of a coupling in connecting and disconnecting the elements.

It is to be understood that this coupling structure may be used in connection with couplings on air pressure systems of railway cars in connecting air hose between cars, on flexible tubing or metal tubing of any character used in the various arts where a disengageable connection between a pair of tubes is desired.

Having thus described my invention, what I claim as new is:—

A hose coupling comprising a female member adapted for receiving a hose at one end and formed with a chamber in the other end having an inwardly extending flange restricting entrance to said chamber, a male assembly having a pair of relatively slidable elements, one of said elements being adapted to receive a hose on one end, expansible means connecting said elements, said male assembly being adapted for insertion into said chamber, said elements being relatively movable for expanding said expansible means to engage and lock said male assembly in said chamber, and resilient means engaged between said elements normally operable to slide said elements relative to one another in one direction for expanding said expansible means, said last named means normally retaining the male assembly in coupled relation with said female member.

In testimony whereof I affix my signature.

CHARLES J. SHADDEN.